Figure 1:
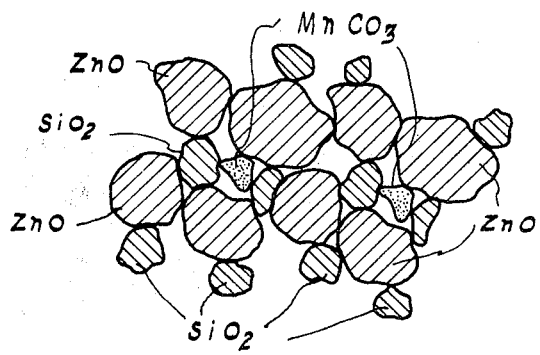

Sept. 28, 1965 P. N. YOCOM ETAL 3,208,950
PROCESS FOR PREPARING LUMINESCENT MATERIALS
Filed July 10, 1962 2 Sheets-Sheet 1

YIELD OF SMALL PARTICLES ABOUT 25 WEIGHT PERCENT OF BATCH

INVENTORS
PERRY N. YOCOM &
SOREN M. THOMSEN
BY W.S. Hill
AGENT

Sept. 28, 1965

P. N. YOCOM ETAL 3,208,950

PROCESS FOR PREPARING LUMINESCENT MATERIALS

Filed July 10, 1962

2 Sheets-Sheet 2

INVENTORS
PERRY N. YOCOM &
SOREN M. THOMSEN

By W.S. Hill

AGENT

United States Patent Office 3,208,950
Patented Sept. 28, 1965

3,208,950
PROCESS FOR PREPARING LUMINESCENT MATERIALS
Perry N. Yocom, Princeton, and Soren M. Thomsen, Pennington, N.J., assignors to Radio Corporation of America, a corporation of Delaware
Filed July 10, 1962, Ser. No. 208,772
11 Claims. (Cl. 252—301.6)

This invention relates to an improved process for preparing luminescent materials (also referred to as phosphors) by solid state reaction. The process of the invention produces a relatively high yield of submicron luminescent particles. Such yield has a much greater brightness than similar yields of submicron particles produced by previous processes. A "submicron particle," as used herein, is less than one micron in its greatest dimension, and is composed of one or more crystals which are joined or cohered together and behave as a single unit.

There are several known processes for preparing luminescent particles by solid state reaction. In the case of luminescent particles for use in cathode ray tubes, the average size of the particles is relatively large, ranging from about five microns for silicate phosphors to about thirty microns for some sulfide phosphors; and less than 0.1 weight percent of the particles are less than one micron in their greatest dimension. The luminescent particles produced by previous processes can be made smaller on the average by grinding; for example, by ball milling for several days. such grinding fractures the crystals which constitute the particles and thereby degrades the average luminescent brightness of the particles.

It is an object of this invention to provide a novel and useful process for producing an improved yield of submicron luminescent particles.

Another object is to provide a process for producing an increased yield of submicron phosphor particles with improved average luminescent brightness.

By the process of the invention, particles of a bulky form of a first reactant, such as bulky silica, and particles of the second reactant are mixed with little or no compaction in a nonaqueous medium; preferably dry (in air or other gaseous medium). By a "bulky form" of a reactant is meant a powder which has an apparent density substantially less than the real density of the reactant. By "compaction" is meant that the apparent density of the mixture of reactants increases substantially over its initial apparent density. The mixture of reactants is heated at temperatures and for a time necessary to form sintered aggregates of phosphor crystals. In one embodiment of the invention, the heating is carried on in a manner which minimizes the growth in size of, and the sintering between, the phosphor crystals. After heating, the sintered aggregates of phosphor crystals are broken apart substantially entirely at the areas of contact between adjacent crystals.

By using at least one bulky reactant and by mixing the reactants with little or no compaction, the areas of contact between the particles of the reactants are not adversely increased. During the subsequent heating step, the phosphor crystals are less strongly sintered to one another and are thereby more easily broken apart at the areas of contact to adjacent crystals. In one embodiment, the reactants are mixed with little or no compaction by tumbling the reactants with resilient objects.

By breaking apart the sintered aggregates substantially entirely at the areas of contact between adjacent crystals, the average luminescent brightness of the product is preserved, and the average particles size is substantially reduced. Significantly, the average crystal size remains substantially unchanged. In one embodiment, the sintered aggregates are broken apart by immersing the sintered aggregates in an aqueous medium, and then rotating a resilient disc in the medium.

Figure 3:
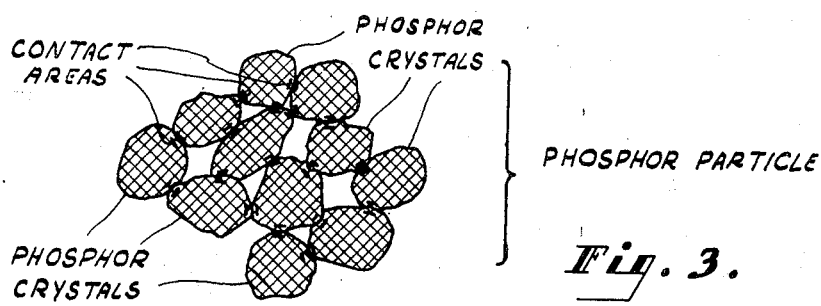
Figure 4:
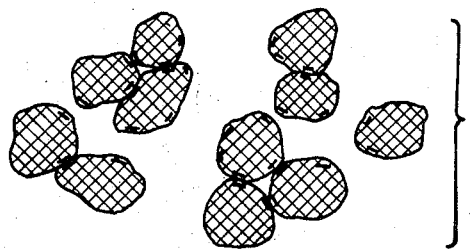
Figure 5:
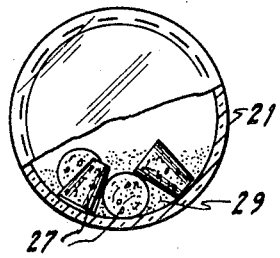
Figure 6:
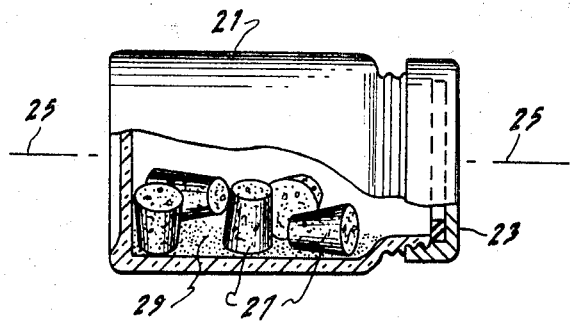
Figure 7:
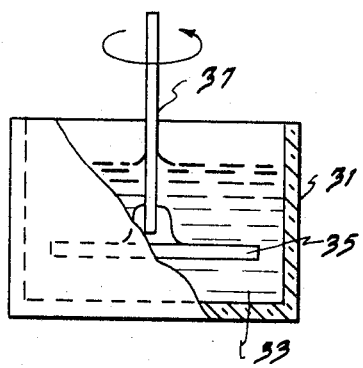

A more detailed description of the invention and illustrative embodiments thereof appear below in conjunction with the drawings in which:

FIGURES 1 to 4 illustrate graphically the steps of a first embodiment of the process of the invention as described with respect to Example 1, FIGURES 5 and 6 are broken away front and side views of a preferred apparatus for mixing the reactants with little or no compaction, and FIGURE 7 is a broken away side view of a preferred apparatus for breaking apart the sintered aggregates of phosphor crystals which constitute the particles of the product.

*Example 1*

Place in a dry cylindrical one pint jar 21, eight #4 rubber stoppers 27, which are slightly tapered cylinders about 1.0 inch in their greatest diameter, about 0.75 inch in their smallest diameter and about 1.0 inch long, as illustrated in FIGURES 5 and 6. Place in the same jar 21 a raw batch consisting of the following reactants:

|  | Grams |
|---|---|
| Bulky silica (includes 3 weight percent $H_2O$) | 20 |
| Zinc oxide | 40 |
| Manganese carbonate | 0.3 |

Close the jar and rotate the jar around its cylindrical axis for about two hours at about ten r.p.m., the axis being approximately horizontal. FIGURES 5 and 6 illustrate a jar 21, closed by a closure 23, during rotation around its cylindrical axis 25. The stoppers 27 tumble within the jar 21 with the reactants, which are indicated by the dots 29. By virtue of the low density and the resiliency of the stoppers 27, the reactants are mixed with little or no compaction. Using denser and/or less resilient materials than rubber results in greater compaction of the reactants. The mixed raw batch is removed from the jar 21 and a ten gram portion of the mixture is placed in a platinum or alumina ceramic boat. The boat is placed in a furnace, heated in air at about 1250° C. for about 10 minutes, and then cooled to room temperature. The composition of the reaction product approaches the molar formula $Zn_2SiO_4:0.01$ Mn, there being a small excess of $SiO_2$ in the product.

Figure 2:
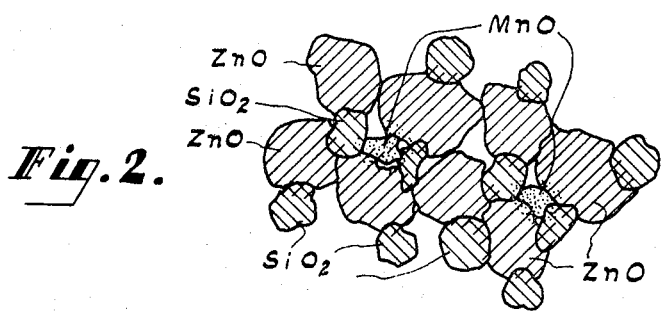

FIGURES 1, 2 and 3 illustrate the changes which take place during heating. Before heating, the reactants are substantially uniformly mixed. As illustrated in FIGURE 1, particles of silica ($SiO_2$), zinc oxide (ZnO), and manganese carbonate ($MnCO_3$) are close to or touching one another. During the heating, first, the particles of manganese carbonate are converted to manganese oxide (MnO). Then, the ions constituting the manganese oxide and zinc oxide particles migrate into the silica particles to form a manganese-activated zinc silicate ($Zn_2SiO_4:Mn$) phosphor as shown by the double hatched region in FIGURES 2 and 3. As illustrated, the zinc oxide and manganese oxide particles shrink in size, and the phosphor forms in the silica particles. Eventually, as shown in FIGURE 3, the reactants have reacted to form sintered aggregates of phosphor crystals. The phosphor crystals are sintered to one another in small areas of contact as indicated by the heavier dash line adjacent the outline of the crystals in FIGURE 3. FIGURE 3 illustrates a single particle which is an aggregate of phosphor crystals.

The aggregates of phosphor crystals are now placed in a container 31 about 3.5 inches inside diameter with a quantity of water 33 about four inches deep as illustrated in FIGURE 7. A rubber disc 35 about three inches in diameter and about a quarter of an inch thick is mounted on a shaft 37 and immersed in the water. The rubber disc 35 is rotated at about 1800 r.p.m. for about ten minutes, to agitate the water and the aggregates contained therein. The effect of the agitation is shown in FIGURE 4. The aggregates are broken apart in the areas of contact between adjacent crystals, to produce submicron particles of one or more crystals. The crystals themselves are not fractured, so that their luminescent properties are not degraded.

The product of the foregoing process is a hydrosol of phosphor particles. About 25 weight percent of the particles are less than one micron in their greatest dimension. Particles which are one micron and larger are removed, as by centrifuging, leaving a hydrosol of submicron particles having an average particle size of about 0.8 micron. The crystals which constitute the particles have an average size of about 0.2 micron as shown by electron microscope examination.

There are numerous variations of the particular process described in Example 1. Any bulky silica may be used. Zinc oxide may be partly or entirely replaced by one or a combination of other metal oxides which produce by reaction with silica a matrix or host crystal for the luminescent material. Suitable metal oxides may be selected from the group consisting of oxides of barium, calcium, cadmium, magnesium, strontium, and combinations thereof. The proportion of zinx oxide (or other oxide or oxides which replace it in whole or in part) are those ordinarily used to provide the desired host crystal. Maganese oxide may be omitted or may be replaced with one or a combination of metal compounds and in proportions which activate the matrix. Some suitable activators are compounds of chromium, uranium, titanium, and rare earth metals. The activators are introduced in the usual proportions, ordinarily between 0.0001 and 0.1 mol per mol of the host crystal. Except for silica, where metal oxides are mentioned, it is intended to include metal oxides per se and compounds which decompose upon heating to produce metal oxides. Some typical compounds are carbonates, bicarbonates, acetates, formates, and hydroxides of the metals. Carbonates are generally preferred.

The reactants are preferably in the form of submicron particles. The particle size of the first reactant (silica in Example 1), into which ions from another reactant migrate is an important determinant to the crystal size of the product. The phosphor crystals are never smaller than the initial size of the particles of the first reactant. A high yield of submicron phosphor particles has been produced when the first reactant had an average particle size of about 0.05 micron. It is believed that the first reactant can have an average particle size of 0.20 micron and less.

The other reactant should also be in the form of submicron particles. While the particle size of the other reactant is not an important factor to determining the crystal size of the product, it is an important factor otherwise. The use of smaller particles of the other reactant permits more intimate mixing of the reactants. More intimate mixing permits the use of minimal heating time and temperature for the solid state reaction because the ions which migrate have shorter paths to travel on the average. As a consequence, the crystals of the product are less severely sintered to one another and are more easily broken apart.

The use of a bulky form of the reactants, particularly the first reactant (silica in Example 1) is another important factor toward obtaining a submicron particle size in the product. In the case of the silica used in Example 1, the real density of silica (quartz) is about 2.65 grams/cc.; whereas the apparent density of the bulky silica is about 0.025 gram/cc. As a consequence of the bulkiness, the aggregates of crystals of the reaction product are more easily broken apart.

The bulky form of the reactants should be retained through the mixing step. Previous processes used a mixing method which compacted the mixture of reactants. Mixing the reactants in an aqueous medium produces substantial compaction at least by the action of surface tension of the water during the subsequent drying of the mixture. Ball milling in its various form produces substantial compaction by the physical action of the balls on the reactants. Simple tumbling of the reactants upon one another does not mix the reactants intimately enough so that minimal heating times and temperatures can be used.

The step of mechanically mixing the reactants with little or no compaction is an important feature of the invention. Such mixing should produce substantially less compaction than ball milling, and provide more effective mixing than simple tumbling of the reactants. This can be achieved, for example, my modifying ordinary ball milling by using balls, discs, or similar objects, which are lighter, are less dense, and are also more resilient than conventional balls. These characteristics are the opposite of what is ordinarily desired for ball milling. FIGURES 5 and 6 illustrate an apparatus for mixing the reactants with little or no compaction. This embodiment uses ordinary chemical rubber stoppers. Light, resilient materials other than rubber, natural or synthetic, and shapes other than stoppers may be used to achieve the desired mixing without compaction. For example, cork, solid plastic, and foam plastic may be used.

The desirable time and other conditions for mixing the reactants are determined empirically for each particular system. The mixing technique described in Example 1 may be continued for about 5 to 240 minutes, rotating the container at about 5 to 100 r.p.m., using stoppers which are about 1 to 4 inches in diameter, in containers which are about 5 to 18 inches in diameter.

The mixing may be carried out in a nonaqueous fluid medium, either gaseous or liquid. The mixing is preferably carried out dry; that is, in air or other gaseous media. Nonreactive liquids which have a low surface tension may be used as a liquid medium. Some suitable liquids are ethanol, methanol, and toluene. In any case, water should not be present because the mixture is compacted after the water is removed.

Heating of the mixture is carried out in such manner as to react a substantial portion of the mixture, to develop the smallest size crystals in the product, to develop good luminescent properties in the crystals, and to produce a minimal degree of sintering between the crystals. By sintering is meant the growing together of adjacent crystals. Sintering is generally attributed to the migration of ions due to the effect of heat. This has two aspects—time and temperature. Shorter heating times and lower heating temperatures produce a lesser degree of sintering. The same degree of sintering which is produced with a particular set of conditions can also be achieved with a shorter heating time at a higher temperature, or a longer heating time at a lower temperature. The ranges of heating time and heating temperature are those ordinarily used to synthesize the phosphor. In the case of zinc orthosilicate phosphors, as in Example 1, the heating time can be between about 1000 and 1400° C. but preferably between 1200 and 1300° C., and the heating time can be between about 5 and 120 minutes.

The heating is carried out in an atmosphere which is ordinarily used to synthesize the phosphor. In the case of a zinc orthosilicate phosphor, as in Example 1, air is a suitable atmosphere. Other suitable atmospheres are oxygen, nitrogen, argon, neon, helium and mixtures thereof. The product is cooled slowly, or is cooled by quenching, as is ordinarily used for the particular composition of the product.

After the product has been cooled, it is deaggregated. The particles or aggregates are broken apart at the regions of sintering, which are the same as the areas of contact, between adjacent crystals. To effect the desired deaggregation, a force is applied which is sufficient to break apart the crystals at the areas of contact between adjacent crystals, but insufficient to fracture the crystals themselves. This is accomplished by the controlled agitation of a suspension of the phosphor particles in water of other liquid. Conventional methods, such as sieving, ball milling, sand milling or tumbling, are ineffective to reduce the particle size down to less than one micron, or else they seriously degrade the luminescent brightness of the product or both. For example, a short ball milling of particles of a standard Willemite phosphor produces small yields (less than one weight percent) of submicron particles, with only slightly degraded luminescent brightness. An extended ball milling of particles of the same Willemite produces an increaesd yield of submicron particles which, on the average, have lost most of their initial luminescent brightness.

FIGURE 7 illustrates an apparatus for achieving the desired deaggregation. The disc 35 may be any resilient material, such as solid plastic, although rubber, natural or synthetic, is preferred. The disc may be 1 to 12 inches in diameter and may be rotated about 100 to 10,000 r.p.m. More than one disc may be mounted on the shaft 37. Deaggregation may be carried out in an aqueous or a non-aqueous liquid.

The deaggregation step produces a lyosol, which is a dispersion of particles in a liquid. After deaggregation, the particles may be fractionated in the liquid to remove all of the particles larger than submicron size. Generally, the remaining submicron particles have an average size between about 0.6 micron and about 0.8 micron, and an average crystal size of about 0.2 micron or less. One may separate a fraction of particles in a more limited size range, such as for example, the 0.3 to 0.5 micron range. Thus, by the process of the invention one may provide particles in any chosen submicron particle size range, limited only by the fractionation process used. Fractionation may be carried out by settling, or by elutriation, but is preferably accomplished by centrifuging. With a single deaggregation and fractionation, the yield of submicron particles, as defined herein, is generally between 10 and 30 weight percent of the total material processed. The removed fraction, which has a particle size larger than submicron size, may be again deaggregated to provide a further yield of submicron particles. Deaggregation may be repeated as many times as desired on the removed fraction without substantially degrading the luminescent properties of the material. With repeated deaggregation, the total yield of small particles has been as high as 80 weight percent of the total material processed. For instance, repeating deaggregation and fractionation a total of three times in Example 1 has increased the yield of submicron particles to about 50 weight percent.

The dispersion of submicron particles in a liquid may now be used to fabricate a luminescent layer for a cathode ray tube.

*Example 2*

Follow the procedure of Example 1 except use the following raw batch:

| | Grams |
|---|---|
| Bulky silica SiO$_2$ (includes 3 weight percent H$_2$O) | 24.4 |
| Magnesium carbonate MgCO$_3$ | 21.8 |
| Cadmium carbonate CdCO$_3$ | 17.8 |
| Zinc oxide ZnO | 4.3 |
| Manganese carbonate MnCO$_3$ | 0.235 |

The product is a red-emitting luminescent material which approaches the molar composition $$5MgO \cdot 2CdO \cdot ZnO \cdot 7SiO_2 : 0.04 \text{ Mn}$$

With one cycle of deaggregation and fractionation, the yield of submicron particles is about 24% of the material processed.

*Example 3*

Follow the procedure of Example 1 except use the following raw batch:

| | Grams |
|---|---|
| Bulky silica SiO$_2$ | 20.0 |
| Cadmium oxide CdO | 80.0 |
| Zinc oxide ZnO | 40.0 |
| Manganese carbonate MnCO$_3$ | 0.30 |

The product is a red-emitting luminescent material which approaches the molar composition $$2CdO \cdot ZnO \cdot SiO_2 : 0.01 \text{ Mn}$$

With one cycle of deaggregation and fractionation, the yield of submicron particles is about 18% of the material processed.

What is claimed is:

1. A process for preparing submicron particles of a luminescent silicate comprising:
   (1) mechanically mixing particles of a bulky form of silica and particles of at least one other reactant in proportions which react to produce said luminescent material, said silica having an apparent density substantially less than the real density thereof, said mixing being conducted in a dry medium by tumbling said reactants with objects of a resilient material,
   (2) heating said mixture for a time and at temperatures sufficient to form sintered aggregates of crystals of said luminescent material, said heating being conducted to produce a minimum of sintering between the crystals of said luminescent material, and then
   (3) immersing said aggregates in a liquid medium, immersing a disc of a resilient material in said medium, and then rotating said disc about its axis in said medium at a speed whereby said aggregates are broken apart substantially entirely at the areas of contact between adjacent crystals.

2. A process for preparing submicron particles of a luminescent silicate by solid state reaction between particles of a bulky form of silica and particles of at least one other reactant, said process comprising:
   (1) mechanically mixing particles of said reactants in proportions which react to produce said luminescent material, said silica having an average particle size of about 0.20 micron and less and an apparent density substantially less than the real density thereof, said mixing being conducted in a dry medium by tumbling said reactants with objects of a resilient material,
   (2) heating said mixture for a time and at temperatures sufficient to react a substantial portion of said mixture to form sintered aggregates of crystals of said luminescent material, said heating being conducted to produce a minimum of sintering between the crystals of said luminescent material, and cooling the reacted mixture,
   (3) immersing said aggregates in a liquid medium, immersing a disc of a resilient material in said medium, and then rotating said disc about its axis in said medium whereby, said aggregates are broken apart at the areas of contact between adjacent crystals,
   (4) removing the submicron particles from said medium; and then
   (5) repeating step (3) with the remaining aggregates.

3. A process for preparing submicron particles of a luminescent silicate by direct solid state reaction between particles of a bulky form of silica and particles of at least one other reactant, said process comprising:
   (1) mechanically mixing particles of said reactants in proportions which react to produce said luminescent silicate, said silica having an average particle size of about 0.20 micron and less and an apparent density substantially less than the real density thereof, said mixing being conducted in a dry medium by placing said reactants in a container, placing objects of a resilient material in said container, closing said container, then rotating said container so that said objects tumble with said reactants, and removing the resultant mixture from said container, (2) heating said mixture for a time and at temperatures sufficient to react a substantial portion of said mixture to form sintered aggregates of crystals of said luminescent silicate, said heating being conducted to produce a minimum of sintering between said crystals of said luminescent silicate, cooling the reacted mixture, and then (3) immersing said aggregates in liquid medium, immersing a disc of a resilient material in said liquid medium, and then rotating said disc about its axis in said liquid medium at a speed whereby said sintered aggregates of crystals are broken apart substantially entirely at the areas of contact between adjacent crystals.

4. A process for preparing submicron particles of a luminescent silicate by direct solid state reaction between particles of silica and particles of at least one other reactant, said reaction being the type wherein crystals of said luminescent silicate are produced by the migration of the ions constituting the other of said reactant into said particles of silica said process comprising:

(1) mechanically mixing particles of said reactants in molar proportions which react to produce said luminescent silicate, said silica having an average particle size of about 0.05 micron and less and an apparent density of about 0.025 grams/cc. and less, said other reactant consisting essentially of particles of at least one metal oxide, said mixing being conducted in a dry medium by placing said reactants in a dry container, placing objects of a resilient material in said container, closing said container, and then rotating said container so that said objects tumble with said reactants, and removing the resultant mixture from said container, (2) heating said mixture for a time and at temperatures sufficient to react a substantial portion of said mixture to form sintered aggregates of crystals of said luminescent silicate, said heating being conducted to produce a minimum of sintering between said crystals of said luminescent silicate, cooling the reacted mixture, (3) breaking apart said aggregates substantially entirely at the areas of contact between adjacent crystals, (4) removing the submicron particles from said broken apart material, and then (5) breaking apart the remaining sintered aggregates substantially entirely at the areas of contact between adjacent crystals.

5. A process for preparing submicron particles of a luminescent silicate by solid state reaction between particles of silica and particles of at least one other reactant, said reaction being the type wherein crystals of said luminescent silicate are produced by the migration of the ions constituting the other of said reactants into said particles of silica, said process comprising:

(1) mechanically mixing particles of said reactants in molar proportions which react to produce said luminescent silicate, said silica having an average particle size of about 0.05 micron and less, and an apparent density of about 0.025 grams/cc. and less, said other reactant consisting essentially of particles of at least one metal oxide, said mixing being conducted in a dry medium by placing said reactants in a dry cylindrical container about 5 to 18 inches in diameter, placing rubber objects about 1 to 4 inches in diameter in said container, closing said container, and then rotating said container about its cylindrical axis, at about 5 to 100 r.p.m. for about 5 to 240 minutes, and removing the resultant mixture from said container, (2) heating said mixture for a time between about 5 to 120 minutes and at temperatures between about 1000 to 1400° C. to react a substantial portion of said mixture to form sintered aggregates of crystals of said luminescent silicate, said heating being conducted to produce a minimum of sintering between the crystals of said luminescent silicate, cooling the reacted mixture, and then (3) immersing said aggregates in an aqueous medium, immersing a rubber disc in said aqueous medium, said disc being about 1 and 12 inches in diameter, and rotating said disc in said aqueous medium, at about 100 to 10,000 r.p.m., whereby said aggregates are broken apart substantially entirely at the areas of contact between adjacent crystals.

6. A process for preparing submicron particles of a luminescent silicate by solid state reaction between particles of silica and particles of at least one other reactant selected from the group consisting of oxides of barium, calcium, cadmium, magnesium, manganese, strontium, zinc, and combinations of said oxides, said process comprising:

(1) mechanically mixing said particles in proportions which react to produce said luminescent silicate, said silica having an average particle size of about 0.05 micron and less and an apparent density of about 0.025 grams/cc., said mixing being conducted in a dry medium by tumbling said particles in a dry container with resilient objects in a manner whereby the initial apparent density of the mixture of said particles is substantially maintained, and removing the resultant mixture from said container, (2) heating said mixture for about 5 to 120 minutes and at about 1000 to 1400° C. to react a substantial portion of said mixture to form sintered aggregates of crystals of said luminescent silicate, said heating being conducted to produce a minimum of sintering between the crystals of said luminescent silicate, cooling the reacted mixture, and then (3) immersing said aggregates in an aqueous medium, immersing a disc of a resilient material in said aqueous medium and rotating said disc at a rotational speed whereby said aggregates are broken apart substantially entirely at the areas of contact between adjacent crystals.

7. A process for preparing submicron particles of a luminescent manganese-activated zinc silicate by solid state reaction between particles of silica and particles of zinc oxide and manganese oxide, said process comprising:

(1) mechanically mixing said particles in proportions which react to produce said luminescent silicate, said silica having an average particle size of about 0.05 micron and less and an apparent density of about 0.025 gram/cc., said mixing being conducted in a dry medium by tumbling said particles in a dry container with resilient objects in a manner whereby the initial apparent density of the mixture of said particles is substantially maintained, and removing the resultant mixture from said container, (2) heating said mixture for about 5 to 120 minutes and at about 1200 to 1300° C. to react a substantial portion of said mixture to form sintered aggregates of crystals of said luminescent silicate, said heating being conducted to produce a minimum of sintering between the crystals of said luminescent silicate, cooling the reacted mixture, and then (3) immersing said aggregates in an aqueous medium, immersing a disc of a resilient material in said aqueous medium and rotating said disc at a rotational speed whereby said aggregates are broken apart substantially entirely at the areas of contact between adjacent crystals.

8. A process for preparing submicron particles, a luminescent manganese-activated cadmium-zinc silicate by solid state reaction between particles of silica and particles of zinc oxide, cadmium oxide, and manganese oxide, said process comprising:
   (1) mechanically mixing said particles in proportions which react to produce said luminescent silicate, said silica having an average particle size of about 0.05 micron and less and an apparent density of about 0.25 gram/cc., said mixing being conducted in a dry medium by tumbling said particles in a container with resilient objects in a manner whereby the initial apparent density of the mixture of said particles is substantially maintained, and removing the resultant mixture from said container,
   (2) heating said mixture for about 5 to 120 minutes and at about 1200 to 1300° C. to react a substantial portion of said mixture and to form sintered aggregates of crystals of said luminescent silicate, said heating being conducted to produce a minimum of sintering between the crystals of said luminescent silicate, cooling the reacted mixtures, and then
   (3) immersing said aggregates in an aqueous medium, immersing a disc of a resilient material in said aqueous medium and rotating said disc at a rotational speed whereby said aggregates are broken apart substantially entirely at the areas of contact between adjacent crystals.

9. A process for preparing submicron particles of a luminescent manganese-activated cadmium-magnesium-zinc silicate by solid state reaction between particles of silica and particles of zinc oxide, cadmium oxide, magnesium oxide, and manganese oxide, said process comprising:
   (1) mechanically mixing said particles in proportions which react to produce said luminescent silicate, said silica having an average particle size of about 0.05 micron and less and an apparent density of about 0.25 gram/cc., said mixing being conducted in a dry medium by tumbling said particles in a container with resilient objects in a manner whereby the initial apparent density of the mixture of said particles is substantially maintained,
   (2) heating said mixture for about 5 to 120 minutes and at about 1200 to 1300° C. to react a substantial portion of said mixture and to form sintered aggregates of crystals of said luminescent silicate, said heating being conducted to produce a minimum of sintering between the crystals of said luminescent silicate, cooling the reacted mixture, and then
   (3) immersing said aggregates in an aqueous medium, immersing a disc of a resilient material in said aqueous medium and rotating said disc at a rotational speed whereby said aggregates are broken apart substantially entirely at the areas of contact between adjacent crystals.

10. In a process for preparing submicron particles of a luminescent silicate including a solid state reaction between particles of a bulky form of silica and particles of at least one other reactant, the steps in said process comprising placing said reactants in a container, placing objects of a resilient material in said container, and then tumbling said objects with said reactants whereby particles of said reactants are intimately mixed and the initial apparent density of the mixture of said reactants remains substantially constant.

11. In a process for preparing submicron particles of a luminescent silicate including a solid state reaction between particles of a bulky form of silica and particles of at least one other reactant to form sintered aggregates of crystals of said luminescent material, the steps in said process comprising immersing said sintered aggregates in a liquid medium, immersing a disc of a resilient material in said medium, and then rotating said disc at speeds whereby said aggregates are broken apart substantially entirely at the areas of contact between adjacent crystals.

References Cited by the Examiner

UNITED STATES PATENTS 757,941 9/56 McKeag.
3,043,781 7/62 Mooney et al.

OTHER REFERENCES

Larach: "Cathodoluminescence Characteristics of Some Barium-Zinc Silicate Phosphors with Manganese Activator," Journal of The Electrochemical Society, September 1951, pp. 369–370.

TOBIAS E. LEVOW, *Primary Examiner.*

MAURICE A. BRINDISI, *Examiner.*

UNITED STATES PATENT OFFICE
CERTIFICATE OF CORRECTION

Patent No. 3,208,950                          September 28, 1965

Perry N. Yocom et al.

It is hereby certified that error appears in the above numbered patent requiring correction and that the said Letters Patent should read as corrected below.

Column 5, lines 30 and 31, after "average" insert -- particle --.

Signed and sealed this 12th day of July 1966.

(SEAL)
Attest:

ERNEST W. SWIDER                          EDWARD J. BRENNER
Attesting Officer                               Commissioner of Patents